US008039030B2

(12) United States Patent
Abril et al.

(10) Patent No.: US 8,039,030 B2
(45) Date of Patent: Oct. 18, 2011

(54) MICROWAVEABLE POPCORN AND METHODS OF MAKING

(75) Inventors: Jesus Ruben Abril, Westminster, CO (US); Thayne Fort, Denver, CO (US)

(73) Assignee: Martek Biosciences Corporation, Columbia, MD (US)

( * ) Notice: Subject to any disclaimer, the term of this patent is extended or adjusted under 35 U.S.C. 154(b) by 1131 days.

(21) Appl. No.: 11/428,296

(22) Filed: Jun. 30, 2006

(65) Prior Publication Data

US 2007/0003687 A1   Jan. 4, 2007

Related U.S. Application Data

(60) Provisional application No. 60/695,996, filed on Jul. 1, 2005, provisional application No. 60/738,304, filed on Nov. 18, 2005, provisional application No. 60/805,721, filed on Jun. 23, 2006.

(51) Int. Cl.
*A23L 1/36* (2006.01)
(52) U.S. Cl. .............. 426/93; 426/601; 426/808
(58) Field of Classification Search ........... 426/601, 426/93, 808
See application file for complete search history.

(56) References Cited

U.S. PATENT DOCUMENTS

| | | | |
|---|---|---|---|
| 4,469,710 A | 9/1984 | Rielley et al. | |
| 4,764,392 A | 8/1988 | Yasufuku et al. | |
| 5,130,242 A | 7/1992 | Barclay | |
| 5,151,291 A | 9/1992 | Tokairin et al. | |
| 5,268,186 A | 12/1993 | Moskowitz | |
| 5,340,594 A | 8/1994 | Barclay | |
| 5,374,445 A | 12/1994 | Havenstein et al. | |
| 5,374,657 A | 12/1994 | Kyle | |
| 5,407,957 A | 4/1995 | Kyle et al. | |
| 5,514,407 A | 5/1996 | Perlman et al. | |
| 5,747,080 A | 5/1998 | Lemke et al. | |
| 5,949,017 A | 9/1999 | Oommen et al. | |
| 5,993,869 A | 11/1999 | Freeport | |
| 6,117,476 A | 9/2000 | Eger et al. | |
| 6,159,525 A | 12/2000 | Lievense et al. | |
| 6,335,370 B1 | 1/2002 | De Mesanstourne et al. | |
| 6,348,229 B1 * | 2/2002 | Eini et al. ............ | 426/611 |
| 6,623,782 B2 | 9/2003 | Hori et al. | |
| 7,157,110 B2 | 1/2007 | Loh et al. | |
| 7,435,436 B2 | 10/2008 | Schilmoeller et al. | |
| 2002/0127306 A1 | 9/2002 | Schmidt et al. | |
| 2003/0099747 A1 * | 5/2003 | Eini et al. ............ | 426/401 |
| 2003/0138477 A1 | 7/2003 | Barclay | |
| 2004/0049062 A1 | 3/2004 | Bijl et al. | |
| 2004/0096550 A1 | 5/2004 | Schilmoeller et al. | |
| 2004/0151823 A1 | 8/2004 | Daniels et al. | |
| 2005/0027004 A1 | 2/2005 | Kyle et al. | |
| 2006/0110521 A1 | 5/2006 | Heise et al. | |
| 2007/0003686 A1 | 1/2007 | Fichtali et al. | |
| 2008/0026103 A1 | 1/2008 | Fichtali et al. | |
| 2008/0107791 A1 | 5/2008 | Fichtali et al. | |
| 2009/0099260 A1 | 4/2009 | Namal Senanayake | |

FOREIGN PATENT DOCUMENTS

| | | |
|---|---|---|
| EP | 0427312 | 5/1991 |
| EP | 0651611 | 5/1995 |
| EP | 0664300 | 7/1995 |
| EP | 0948907 | 10/1999 |
| EP | 1 215 274 A1 | 6/2002 |
| EP | 1482814 | 12/2004 |
| EP | 1562448 | 8/2005 |
| GB | 2194876 | 3/1988 |
| JP | 02-203741 | 8/1990 |
| JP | 02-243622 | 9/1990 |
| JP | 07-313055 | 12/1995 |
| WO | WO 93/22933 | 11/1993 |
| WO | WO 97/36996 A2 | 10/1997 |
| WO | WO 97/43362 A1 | 11/1997 |
| WO | WO 00/33668 | 6/2000 |
| WO | WO 00/69273 | 11/2000 |
| WO | WO 03/077675 | 9/2003 |
| WO | WO 03/105606 | 12/2003 |
| WO | WO 2004/045308 | 6/2004 |
| WO | WO 2004/108874 | 12/2004 |
| WO | WO 2004/110168 | 12/2004 |
| WO | WO 2006/004906 | 1/2006 |

OTHER PUBLICATIONS

Hui, Y. H. 1996. Bailey's Industrial Oil and Fat Products, 5th edition, vol. 1. John Wiley & Sons, Inc., New York, p. 484-485.*
Hui, Y. H. 1996. Bailey's Industrial Oil and Fat Products, vol. 1, 5th edition. John Wiley & Sons, Inc. New York. p. 444-447.*
Fischer, "Sorting Fat from Fiction," Prepared Foods Dec. 10, 2003, available at http://www.preparedfoods.com/CDA/Archives/938d322e33788010VgnVCM100000f932a8c0, pp. 1-5.
Kuntz, "Designer Fats for Bakery," Food Product Design 2002, November, pp. 1-7.
International Preliminary Report on Patentability for International (PCT) Patent Application No. PCT/US06/25799, mailed Jul. 10, 2008.

(Continued)

*Primary Examiner* — Carolyn Paden
(74) *Attorney, Agent, or Firm* — Sterne, Kessler, Goldstein & Fox P.L.L.C.

(57) ABSTRACT

Microwaveable popcorn compositions, products and methods of making the same are disclosed. The composition includes unpopped popcorn kernels, an oil comprising at least one omega-3 LC PUFA, and an oil that is solid at about 20° C. The an oil comprising at least one omega-3 LC PUFA can include a microbial oil prepared by extraction with isopropanol and water in the absence of winterization.

30 Claims, 1 Drawing Sheet

OTHER PUBLICATIONS

Christie "Chapter 1 The Structure, Chemistry and Occurrence of Lipids", from Lipid Analysis. Isolation, Separation, Identification and Structural Analysis of Lipids, 2nd Edition, 1982, p. 1-16.

International Search Report and Written Opinion for PCT Application PCT/US06/25799, mailed Jun. 3, 2008, 8 pages.

"Chapter 1 The Stucture, Chemistry and Occurrence of Lipids", Lipid Analysis, date unknown, p. 1-16.

"Sensory Evaluation of Microwavable Popcorn", Martek Biosciences Corporation, date unknown, 1 page.

Barclay et al., "Microalgae-based ingredients are useful vegetarian sources of DHA n-3 for functional foods", May 16, 2001, 6 pages.

Stagnitti "Functional confectionery—sweetening the omega-3 'pill'", date unknown, p. 60.

Stagnitti et al., "Fermented fortification", Dairy Industries International, Jun. 2001, p. 26-27.

Certik, M. and Shimizu, S., "Biosynthesis and regulation of microbial polyunsaturated fatty acid production," *J. Biosci. Bioeng.* 87(1):1-14, Society for Bioscience and Bioengineering, Japan (1999).

Frankel, Edwin N., "Chapter 10: Food," in *Lipid Oxidation*, The Oily Press Ltd., UK, pp. 187-225, (1998).

Huang, J., et al., "Profile of polyunsaturated fatty acids produced by *Thraustochytrium* sp. KK17-3," *JAOCS* 78(6):605-610, AOCS Press, United States (2001).

Innis, S.M. and Hansen, J.W., "Plasma fatty acid responses, metabolic effects, and safety of microalgal and fungal oils rich in arachidonic and docosahexaenoic acids in healthy adults," *Am. J. Clin. Nutr.* 64(2):159-67, American Society of Clinical Nutrition, United States (1996).

Jadhav, S.J., et al., "Lipid Oxidation in Biological and Food Systems," in *Food Antioxidants*, Madhavi et al., eds, Marcel Dekker, New York, pp. 5-63, (1996).

Labuza, T.P., et al., "Kinetics of Lipid Oxidation," *CRC Critical Reviews in Food Technology* 2(3):355-405, (1971).

Vali, S.R., et al., "An efficient method for the purification of arachidonic acid from fungal single-cell oil (ARASCO)," *JAOCS* 80(7):725-730, AOCS Press, United States (2003).

Ward, O.P. and Singh, A., "Omega-3/6 fatty acids: Alternative sources of production," *Process Biochemistry* 40(12):3627-3652, Elsevier Applied Science, England (2005).

Warner, K., "7. Chemistry of Frying Oils," in *Food Lipids: Chemistry, Nutrition, and Biotechnology*, 3rd Edition, Akoh, et al., eds., CRC Press, USA, pp. 205-222, (1998).

"Know Your Fats," American Heart Association Learn and Live, content last updated Jan. 29, 2010, accessed at <http://www.americanheart.org/presenter.jhtml?identifier=532>, on Mar. 24, 2010.

International Search Report for International (PCT) Patent Application No. PCT/US06/25797, ISA/US, Commissioner for Patents, United States, mailed Oct. 11, 2007.

International Search Report for International (PCT) Patent Application No. PCT/US08/74790, ISA/US, Commissioner for Patents, United States, mailed Nov. 28, 2008.

* cited by examiner

Microwavable Popcorn Process Flow mix Martek DHA-HM with all other added ingredients → 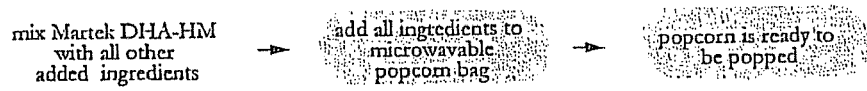

FIG. 1A

Stability and Sensory Analysis

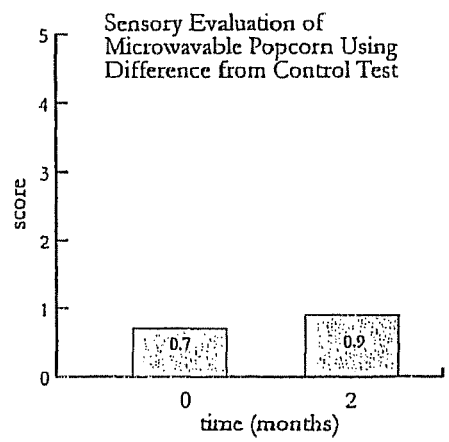

FIG. 1B

Popcorn was fortified with 100mg DHA/35g serving.

Conclusion: Statistically, the results show that panelists were unable to differentiate between the control, blind control and DHA-fortified sample.

0 = no difference from control
10 = extreme difference from control

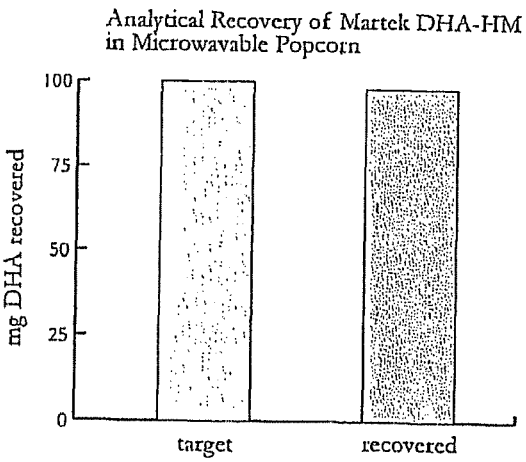

FIG. 1C

Conclusion: based on 100mg DHA/35g serving, ~100% of the DHA was recovered.

MICROWAVEABLE POPCORN AND METHODS OF MAKING

CROSS-REFERENCE TO RELATED APPLICATIONS

This application claims priority from U.S. Provisional Patent Application Ser. No. 60/695,996, filed Jul. 1, 2005; from U.S. Provisional Patent Application Ser. No. 60/738,304, filed Nov. 18, 2005; and from U.S. Provisional Patent Application Ser. No. 60/805,721, filed Jun. 23, 2006. The entire disclosure of each of U.S. Provisional Patent Application Ser. No. 60/695,996, U.S. Provisional Patent Application Ser. No. 60/738,304, and U.S. Provisional Patent Application Ser. No.60/805,721 is incorporated herein by reference in its entirety.

FIELD OF THE INVENTION

The present invention relates to food products. More particularly, the present invention relates to microwaveable popcorn compositions and products containing omega-3 long chain polyunsaturated fatty acids.

BACKGROUND OF THE INVENTION

It is desirable to increase the dietary intake of the beneficial omega-3 polyunsaturated fatty acids (omega-3 PUFA), and omega-3 long chain polyunsaturated fatty acids (omega-3 LC PUFA). As used herein, reference to a long chain polyunsaturated fatty acid or LC PUFA, refers to a polyunsaturated fatty acid having 18 or more carbons. Omega-3 PUFAs are recognized as important dietary compounds for preventing arteriosclerosis and coronary heart disease, for alleviating inflammatory conditions, cognitive impairment and dementia related diseases and for retarding the growth of tumor cells. One important class of omega-3 PUFAs is omega-3 LC PUFAs.

Fatty acids are carboxylic acids and are classified based on the length and saturation characteristics of the carbon chain. Short chain fatty acids have 2 to about 6 carbons and are typically saturated. Medium chain fatty acids have from about 6 to about 16 carbons and may be saturated or unsaturated. Long chain fatty acids have from 18 to 24 or more carbons and may also be saturated or unsaturated. In longer fatty acids there may be one or more points of unsaturation, giving rise to the terms "monounsaturated" and "polyunsaturated", respectively. Long chain PUFAs (LC PUFAs) are of particular interest in the present invention.

LC PUFAs are categorized according to the number and position of double bonds in the fatty acids according to a well understood nomenclature. There are two common series or families of LC PUFAs, depending on the position of the double bond closest to the methyl end of the fatty acid: the ω-3 (or n-3 or omega-3) series contains a double bond at the third carbon, while the ω-6 (or n-6 or omega-6) series has no double bond until the sixth carbon. Thus, docosahexaenoic acid ("DHA") has a chain length of 22 carbons with 6 double bonds beginning with the third carbon from the methyl end and is designated "22:6 n-3". Other important omega-3 LC PUFAs include eicosapentaenoic acid ("EPA") which is designated "20:5 n-3" and docosapentaenoic acid ("DPA") which is designated "22:5 n-3.". In addition, omega-6 LC PUFAs can be used in connection with the present invention. For example, arachidonic acid ("ARA") which is designated "20:5 n-6" and docosapentaenoic acid ("DPA") which is designated "22:5 n-6" are suitable.

De novo or "new" synthesis of the omega-3 fatty acid DHA does not occur in the human body; however, the body can convert shorter chain fatty acids to LC PUFAs such as DHA, although at very low efficiency. Omega-3 fatty acids must be part of the nutritional intake since the human body cannot insert double bonds closer to the omega end than the seventh carbon atom counting from that end of the molecule. Thus, all metabolic conversions occur without altering the omega end of the molecule that contains the omega-3 double bond.

Over the past few decades, health experts have recommended diets lower in saturated fats and higher in polyunsaturated fats. While this advice has been followed by a number of consumers, the incidence of heart disease, cancer, diabetes and many other debilitating diseases has continued to increase steadily. Scientists agree that the type and source of polyunsaturated fats is as critical as the total quantity of fats. The most common polyunsaturated fats are derived from vegetable matter and are lacking in long chain fatty acids having 20 or more carbons (most particularly omega-3 LC-PUFAs). In addition, the hydrogenation of polyunsaturated fats to create synthetic fats has contributed to the rise of certain health disorders and exacerbated the deficiency in some essential fatty acids. Indeed, many medical conditions have been identified as benefiting from an omega-3 supplementation. These include acne, allergies, Alzheimer's, arthritis, atherosclerosis, breast cysts, cancer, cystic fibrosis, diabetes, eczema, hypertension, hyperactivity, intestinal disorders, kidney dysfunction, leukemia, and multiple sclerosis. Of note, the World Health Organization has recommended that infant formulas be enriched with omega-3 fatty acids.

The polyunsaturates derived from meat contain significant amounts of omega-6 but little or no omega-3. While omega-6 and omega-3 fatty acids are both necessary for good health, they are preferably consumed in a balance of about 4:1. Today's Western diet has created a serious imbalance with current consumption on average of 20 times more omega-6 than omega-3. Concerned consumers have begun to look for health food supplements to restore the equilibrium. Principal sources of omega-3 are flaxseed oil and fish oils. The past decade has seen rapid growth in the production of flaxseed and fish oils. Both types of oil are considered good dietary sources of omega-3 polyunsaturated fats. Flaxseed oil contains no EPA, DHA, or DPA but rather contains linolenic acid--a building block that can be elongated by the body to build longer chain PUFAs. There is evidence, however, that the rate of metabolic conversion can be slow and unsteady, particularly among those with impaired health. Fish oils vary considerably in the type and level of fatty acid composition depending on the particular species and their diets. For example, fish raised by aquaculture tend to have a lower level of omega-3 fatty acids than fish from the wild. In light of the health benefits of omega-3 LC PUFAs, it would be desirable to supplement foods with such fatty acids.

Due to the scarcity of sources of omega-3 LC PUFAs, typical home-prepared and convenience foods are low in both omega-3 PUFAs and omega-3 LC PUFAs (carbon chain length greater than 18, and preferably greater than 20), such as docosahexaenoic acid, docosapentaenoic acid, and eicosapentaenoic acid. In light of the health benefits of such omega-3 LC PUFAs, it would be desirable to supplement foods with such fatty acids.

In light of the desirability of supplementing foods with omega-3 LC PUFAs and in view of the shortcomings of the prior art in providing these foods, there is a need for methods for enriching foods with omega-3 LC PUFAs and also for food oil compositions and food products comprising omega-3 LC PUFAs These and other needs are answered by the present invention.

SUMMARY OF THE INVENTION

The present invention is directed toward popcorn products having high contents of omega-3 PUFAs and methods of producing the same.

More particularly, the present invention includes a microwaveable popcorn composition comprising unpopped popcorn kernels, an oil comprising at least one omega-3 long chain polyunsaturated fatty acid (omega-3 LC PUFA containing oil), and an oil that is solid at 20° C. In preferred embodiments, the omega-3 LC PUFA containing oil is dispersed in the oil that is solid at 20° C. In preferred embodiments, the oil that is solid at 20° C. can be palm oil, palm kernel, cocoa, or shea nut oil. The oil that is solid at 20° C. can be a saturated oil, a partially hydrogenated oil, or a fully hydrogenated oil.

In alternate embodiments, the omega-3 LC PUFA can be docosahexaenoic acid, eicosapentaenoic acid, docosapentaenoic acid or arachidonic acid. The omega-3 LC PUFA containing oil preferably can be from a microbial source, such as a microorganism selected from algae, protists, bacteria or fungi and/or an oleaginous microorganism. The microbial source preferably can be a microorganism selected from microorganisms of the genus *Thraustochytrium*, microorganisms of the genus *Schizochytrium*, microorganisms of the genus *Althornia*, microorganisms of the genus *Aplanochytrium*, microorganisms of the genus *Japonochytrium*, microorganisms of the genus *Elina*, microorganisms of the genus *Crypthecodinium*, and in preferred embodiments is a microorganism from microorganisms of the genus *Schizochytrium*, and microorganisms of the genus *Crylpthecodiniun*. Alternatively, the omega-3 LC PUFA containing oil can be from a plant source, such as a from soybean, corn, safflower, sunflower, canola, flax, peanut, mustard, rapeseed, chickpea, cotton, lentil, white clover, olive, palm, borage, evening primrose, linseed and tobacco. The plants can be either genetically modified to produce long chain polyunsaturated fatty acids or not. The oil can alternatively be from an animal source, such as aquatic animals, animal tissues or animal products. The oil preferably can include at least about 20% omega-3 LC PUFAs. In an alternative embodiment the oil can include at least about 30% omega-3 LC PUFAs.

In an embodiment of the invention, the omega-3 LC PUFA containing oil can be minimally processed. In a further embodiment, the oil not winterized.

The microwaveable popcorn composition preferably can include between about 5 mg and about 150 mg omega-3 LC PUFA per serving of the popcorn composition, and more preferably between 30 mg and 100 mg omega-3 LC PUFA per serving of the popcorn composition.

The microwaveable popcorn compositions can also include an antioxidant, which preferably can be vitamin E, butylhydroxytoluene (BHT), butylhydroxyanisole (BHA), tert-butylhydroquinone (TBHQ), propyl gallate (PG), vitamin C, a phospholipid, or a natural antioxidant, and in a preferred embodiment is TBHQ. The antioxidant preferably can be present in an amount of between about 0.01% and about 0.2% by weight of the oil or between about 0.05% and about 0.15% by weight of the oil.

In additional embodiments, the microwaveable popcorn compositions can also include a flavoring agent. The flavor agent can be a natural flavor or an artificial flavor, or a mixture thereof. Preferred flavoring agent include butter, artificial butter, cheese, pizza, sugar, sweeteners, and spices.

Another embodiment of the invention is a microwaveable popcorn product. The product comprises a container suitable for use in a microwave popcorn popping process, and a microwaveable popcorn composition of the present invention.

An additional embodiment of the invention includes a process for preparing microwaveable popcorn compositions of the invention. The process comprises combining an omega-3 LC PUFA-containing oil with an oil that is solid at room temperature.

Another embodiment of the invention is process for preparing popcorn. The process comprises subjecting the microwaveable compositions of the invention to microwave energy until the unpopped popcorn kernels are popped. Still another embodiment of the invention includes a popcorn product produced by the aforementioned process. The product has acceptable sensory characteristics, correct dispersion of the active ingredient in the product and allows for a high recovery of the active ingredient in the food product.

BRIEF DESCRIPTION OF THE DRAWINGS OF THE INVENTION

FIG. 1A is a schematic drawing showing a microwavable popcorn process flow.

FIG. 1B is a graph showing sensory evaluation of microwaveable popcorn using difference from control test.

FIG. 1C is a graph showing analytical recovery of DHA-HM in microwaveable popcorn.

DETAILED DESCRIPTION OF THE INVENTION

The microwaveable popcorn compositions, products and methods for producing the same that enhance the omega-3 LC PUFA content of popcorn products, provide for increased intake of omega-3 LC PUFAs. This improvement can provide health benefits to those consuming such products. The present invention also provides methods to minimize the oxidative degradation of omega-3 PUFAs in the food products and food oil compositions.

In various embodiments, the present invention is directed toward microwaveable popcorn products having high contents of omega-3 LC PUFAs and methods of producing the same. The process of the present invention includes combining an omega-3 LC PUFA-containing oil with an oil that is solid at about 20° C. (i.e., about room temperature) and popcorn kernels to form a product that, when subjected to microwave energy, will form popcorn. In this manner, the omega-3 LC PUFA is stabilized during the storage phase prior to popping and upon being popped, coats the popcorn.

The oils of the invention comprise at least one omega-3 LC PUFA. Preferred omega-3 LC PUFAs include, for example, docosahexaenoic acid C22:6(n-3) (DHA), eicosapentaenoic acid C20:5(n-3) (EPA), and omega-3 docosapentaenoic acid C22:5(n-3) (DPA). DHA is particularly preferred. As noted above, LC PUFAs include PUFAs having 18 or more carbons and in preferred embodiments, the omega-3 LC PUFA has 20 or more carbons or 22 or more carbons. The PUFAs preferably can be in any of the common forms found in natural lipids including but not limited to triacylglycerols, diacylglycerols, and monoacyglycerols. Reference to an oil comprising an omega-3 LC PUFA, as used in the present invention, can refer to either an oil comprising only a single omega-3 LC PUFA, such as DHA or an oil comprising a mixture of omega-3 LC PUFAs such as DHA and EPA. Fatty acids other than omega-3 fatty acids are also typically present in oils. The terms "oil" or "oils" as recited herein can include an oil that is liquid at room temperature (20° C.) and also an oil that is solid at room temperature. Sometimes oils that are solid at room temperature are referred to in the art as "fats", however in the present disclosure, the term "oils" will include what others sometimes refer to separately as "oils" and "fats."

A preferred source of oils that comprise omega-3 LC PUFAs in the compositions and methods of the present invention includes a microbial source. Microbial sources and methods for growing microorganisms comprising LC PUFAs are known in the art (*Industrial Microbiology and Biotechnology*, 2nd edition, 1999, American Society for Microbiology). Preferably, the microorganisms are cultured in a fermentation medium in a fermentor. The methods and compositions of the present invention are applicable to any microorganism that produces LC PUFA such as, for example algae, protists, bacteria and fungi (including yeast).

Microbial sources preferably can include microorganisms such as algae, bacteria, fungi and/or protists. Preferred organisms include those selected from the group consisting of golden algae (such as microorganisms of the kingdom Stramenopiles), green algae, diatoms, dinoflagellates (such as microorganisms of the order Dinophyceae including members of the genus *Crypthecodinium* such as, for example, *Crypthecodinium cohnii*). Members of the microbial group Stramenopiles include microalgae and algae-like microorganisms, including the following groups of microorganisms: Hamatores, Proteromonads, Opalines, Develpayella, Diplophrys, Labrinthulids, Thraustochytrids, Biosecids, Oomycetes, Hypochytridiomycetes, Commation, Reticulosphaera, Pelagomonas, Pelagococcus, Ollicola, Aureococcus, Parmales, Diatoms, Xanthophytes, Phaeophytes (brown algae), Eustigmatophytes, Raphidophytes, Synurids, Axodines (including Rhizochromulinaales, Pedinellales, Dictyochales), Chrysomeridales, Sarcinochrysidales, Hydrurales, Hibberdiales, and Chromulinales. This detailed description of the invention will discuss processes for growing microorganisms which are capable of producing lipids comprising omega-3 fatty acids, in particular microorganisms that are capable of producing DHA (or closely related compounds such as DPA or EPA). Additional preferred microorganisms, especially for producing DHA and DPA, are algae, such as Thraustochytrids of the order Thraustochytriales, including *Thraustochytrium*, *Schizochytrium* and *Ulkenia*, and including Thraustochytriales which are disclosed in commonly assigned U.S. Pat. Nos. 5,340,594 and 5,340,742, both issued to Barclay, all of which are incorporated herein by reference in their entirety, in addition to microorganisms of the genus *Althornia*, genus *Aplanochytrium*, genus *Japonochytrium*, and genus *Elina* and mixtures thereof. More preferably, the microorganisms are selected from the group consisting of microorganisms having the identifying characteristics of ATCC number 20888, ATCC number 20889, ATCC number 20890, ATCC number 20891 and ATCC number 20892, strains of *Crypthecodinium cohnii* (especially for producing DHA), mutant strains derived from any of the foregoing, and mixtures thereof. It should be noted that many experts agree that *Ulkenia* is not a separate genus from the genus *Thraustochytrium*. Accordingly, as used herein, the genus *Thraustochytrium* will include *Ulkenia*. Oleaginous microorganisms are also preferred. As used herein, "oleaginous microorganisms" are defined as microorganisms capable of accumulating greater than 20% of the weight of their cells in the form of lipids. Genetically modified microorganisms that produce LC PUFAs are also suitable for the present invention. These preferably can include naturally LC PUFA-producing microorganisms that have been genetically modified as well as microorganisms that do not naturally produce LC PUFAs but that have been genetically engineered to do so.

Suitable organisms may be obtained from a number of available sources, including by collection from the natural environment. For example, the American Type Culture Collection currently lists many publicly available strains of microorganisms identified above. As used herein, any organism, or any specific type of organism, includes wild strains, mutants, or recombinant types. Growth conditions in which to culture or grow these organisms are known in the art, and appropriate growth conditions for at least some of these organisms are disclosed in, for example, U.S. Pat. Nos. 5,130,242, 5,407,957, 5,397,591, 5,492,938, and 5,711,983, all of which are incorporated herein by reference in their entirety.

A preferred LC PUFA containing oil, such as one from a microbial source, can preferably have less than 7, less than 6, less than 5 or less than 4 PUFAs, in amounts greater than about 2% by weight, greater than about 2.5% by weight, greater than about 3% by weight or greater than about 3.5% by weight of total fatty acids. Preferred microbial oils that are useful in the present invention include those that are disclosed in U.S. Patent Application No. 60/695,996 (entitled "Polyunsaturated Fatty Acid-Containing Oil Product and Uses and Production Thereof," filed Jul. 1, 2005; and U.S. Patent Application No. 60/738,304 (of the same time title, filed Nov. 18, 2005.), both of which are incorporated by reference herein in their entirety. Some of such oils are not subjected to winterization. A preferred microbial oil is known as Martek DHA-HM and is produced by a process as disclosed in the foregoing patent applications, including a propanol and water extraction process that produces a product with a semi-solid characteristic.

Another preferred source of oils comprising LC PUFAs includes a plant source, such as oilseed plants. Since plants do not naturally produce LC PUFAs of 20 carbons or longer, plants producing LC PUFAs having 20 or more carbons preferably are those genetically modified to express genes that produce such LC PUFAs. Such genes preferably can include genes encoding proteins involved in the classical fatty acid synthase pathways, or genes encoding proteins involved in the PUFA polyketide synthase (PKS) pathway. The genes and proteins involved in the classical fatty acid synthase pathways, and genetically modified organisms, such as plants, transformed with such genes, are described, for example, in Napier and Sayanova, *Proceedings of the Nutrition Society* (2005), 64:387-393; Robert et al., *Functional Plant Biology* (2005) 32:473-479; or U.S. Patent Application Publication 2004/0172682. The PUFA PKS pathway, genes and proteins included in this pathway, and genetically modified microorganisms and plants transformed with such genes for the expression and production of PUFAs are described in detail in: U.S. Pat. No. 6,566,583; U.S. Patent Application Publication No. 20020194641, U.S. Patent Application Publication No. 20040235127A1, and U.S. Patent Application Publication No. 20050100995A1, each of which is incorporated herein by reference in its entirety.

Preferred oilseed crops include soybeans, corn, safflower, sunflower, canola, flax, peanut, mustard, rapeseed, chickpea, cotton, lentil, white clover, olive, palm oil, borage, evening primrose, linseed, and tobacco that have been genetically modified to produce LC PUFAs as described above.

Genetic transformation techniques for microorganisms and plants are well-known in the art. Transformation techniques for microorganisms are well known in the art and are discussed, for example, in Sambrook et al., 1989,*Molecular Cloning: A Laboratory Manual*, Cold Spring Harbor Labs Press. A general technique for transformation of dinoflagellates, which can be adapted for use with *Crypthecodinium cohnii*, is described in detail in Lohuis and Miller, *The Plant*

*Journal* (1998) 13(3): 427-435. A general technique for genetic transformation of Thraustochytrids is described in detail in U.S. Patent Application Publication No. 20030166207, published Sep. 4, 2003. Methods for the genetic engineering of plants are also well known in the art. For instance, numerous methods for plant transformation have been developed, including biological and physical transformation protocols. See, for example, Miki et al., "Procedures for Introducing Foreign DNA into Plants" in *Methods in Plant Molecular Biology and Biotechnology*, Glick, B. R. and Thompson, J. E. Eds. (CRC Press, Inc., Boca Raton, 1993) pp. 67-88. In addition, vectors and in vitro culture methods for plant cell or tissue transformation and regeneration of plants are available. See, for example, Gruber et al., "Vectors for Plant Transformation" in *Methods in Plant Molecular Biology and Biotechnology*, Glick, B. R. and Thompson, J. E. Eds. (CRC Press, Inc., Boca Raton, 1993) pp. 89-119. See also, Horsch et al., *Science* 227:1229 (1985); Kado, C. I., *Crit; Rev. Plant. Sci.* 10:1 (1991); Moloney et al., *Plant Cell Reports* 8:238 (1989); U.S. Pat. No. 4,940,838; 5,464,763; Sanford et al., *Part. Sci. Technol.* 5:27 (1987); Sanford, J. C., *Trends Biotech.* 6:299 (1988); Sanford, J. C., *Physiol Plant* 79:206 (1990); Klein et al., *Biotechnology* 10:268 (1992); Zhang et al., *Bio/Technology* 9:996 (1991); Deshayes et al., *EMBO J*, 4:2731 (1985); Cliistou et al., *Proc Natl. Acad. Sci. USA* 84:3962 (1987); Hain et al., *Mol. Gen. Genet.* 199:161 (1985); Draper et al., *Plant Cell Physiol.* 23:451 (1982); Donn et al., In Abstracts of VIIth International Congress on Plant Cell and Tissue Culture IAPTC, A2-38, p. 53 (1990); D'Halluin et al., *Plant Cell* 4:1495-1505 (1992) and Spencer et al., *Plant Mol. Biol.* 24:51-61 (1994).

When oilseed plants are the source of LC PUFAs, the seeds preferably can be harvested and processed to remove any impurities, debris or indigestible portions from the harvested seeds. Processing steps vary depending on the type of oilseed and are known in the art. Processing steps preferably can include threshing (such as, for example, when soybean seeds are separated from the pods), dehulling (removing the dry outer covering, or husk, of a fruit, seed, or nut), drying, cleaning, grinding, milling and flaking. After the seeds have been processed to remove any impurities, debris or indigestible materials, they can be added to an aqueous solution preferably water, and then mixed to produce a slurry. Preferably, milling, crushing or flaking is performed prior to mixing with water. A slurry produced in this manner preferably can be treated and processed the same way as described for a microbial fermentation broth. Size reduction, heat treatment, pH adjustment, pasteurization and other known treatments preferably can be used in order to improve quality (nutritional and sensory).

Another preferred source of oils that comprise LC PUFAs includes an animal source. Examples of animal sources include aquatic animals (e.g., fish, marine mammals, and crustaceans such as krill and other euphausids) and animal tissues (e.g., brain, liver, eyes, etc.) and animal products such as eggs or milk. Techniques for recovery of LC PUFA containing oils from such sources are known in the art.

Preferably, the oil comprises at least about 20% of omega-3 LC PUFA, at least about 30% of omega-3 LC PUFA, at least about 40% of omega-3 LC PUFA, at least about 50% of omega-3 LC PUFA, at least about 60% of omega-3 LC PUFA, 70% of omega-3 LC PUFA, and at least about 80% of omega-3 LC PUFA.

In the methods, compositions, and products of the invention, the LC-PUFA containing oil can be combined with an oil (base oil) that is solid at about 20° C. (i.e. a fat). The oil that is solid at room temperature can be a saturated oil, a partially hydrogenated oil, or a fully hydrogenated oil.

Suitable oils that are solid at about 20° C. include tropical oils, such as palm, palm kernel, cocoa, or shea nut oils. Additional suitable oils include partially hydrogenated or fully hydrogenated oils including vegetable oils, sunflower oil, safflower oil, rapeseed oil, cottonseed oil, maize oil, linseed oil, groundnut oil, or soybean oil. Other suitable oils include nut oils (such as almond, brazil nut, cashew, coconut, hazelnut, pecan, peanut, and walnut), olive oil, sesame oil, or flaxseed oil.

An oil useful as a base oil in the present invention, in one embodiment, has a melting temperature that is similar to the melting temperature of the LC-PUFA containing oil. More particularly, the melting temperatures of the two oils are within about 20° C. of each other, about 19° C. of each other, and so on in one degree increments to having the same melting temperature. The melting temperature is typically in the range of about 25° C.-about 60° C., or about 35° C.-about 45° C., or about 36° C.-about 43° C. When the base oil is combined with an LC-PUFA containing oil that has a similar or substantially similar melting temperature and the mix is subjected to heat, followed by a lowering a temperature, the oils resolidify homogeneously, e.g., having a uniform or non-lumpy appearance. It is desirable that the storage temperature for the composition not exceed the melting temperature (as described above) of either the base oil or the LC-PUFA containing oil so that the mixture remains stable and homogeneous.

The flavor of the base oil may be a determining factor when selecting an oil variety for use as a base oil, especially if little flavoring agent is used. Most oils have a neutral flavor when properly processed and should be suitable for fortification by introduction of an omega-3 LC PUFA containing oil. Oils with similar melting points as palm oil include, but are not limited to, partially or fully hydrogenated palm kernel oil, fractionated palm kernel oil, partially or fully hydrogenated soybean oil, partially or fully hydrogenated coconut oil, and partially or fully hydrogenated cottonseed oil. Most oil manufacturers can blend oil varieties or control hydrogenation, fractionation or interesterification enough to modify the melting temperature to the customer needs.

In preferred embodiments, the ratio of the base oil to LC-PTJFA containing oil can preferably vary from about 20:1 to about 40:1 depending on the desired level of fortification with LC PUFA. For example, if fortifying at 50 mg DHA/28 grams unpopped popcorn kernels using Martek DHA-HM oil (Martek Biosciences Corporation, Columbia, MD), the ratio is 40:1 and if fortifying at 100 mgDHA/28 g unpopped popcorn kernels, the ratio is 20:1.

Unpopped popcorn kernels that are suitable for use in the practice of the invention can be any of a variety of kernels that have a moisture content sufficient for acceptable expansion of the corn during popping.

Unpopped popcorn kernels preferably are any hulled or dehulled popcorn kernel known for use in microwave popcorn products. The kernels may be large, medium, small, white, yellow, flavored, or any type of available kernel. Usually, the popcorn kernels have an internal moisture level of about 11-about 16%.

Without intending to be bound by theory, the preparation of a mixture of an omega-3 LC PUFA containing oil with an oil that is solid at 20° C. is believed to provide a stabilizing effect on the oil comprising an omega-3 LC PUFA, reducing the likelihood and/or the extent of oxidative degradation that the omega-3 LC-PUFAs would otherwise undergo.

Methods of package production for microwaveable popcorn are known and any such methods are suitable with the present invention. Contemporary methods of filling microwave popcorn bags are known in the alt. (See, for example, U.S. Pat. No. 4,604,854 entitled "Machine For Forming, Filling and Sealing Bags", issued Aug. 12, 1986 to D. W. Andreas). In one known method, microwave bags having an unsealed open end are advanced to a first kernel popcorn filling station. While being maintained in an open position, the kernel popcorn is charged to a desired channel. Thereafter, the bags are advanced to a second filling station at which an oil (e.g., in the present invention, the mixture of LC-PUFA containing oil/oil that is solid at 20° C. )/salt slurry is added to the bag. Prior to filling, the oil can be heated to well above its melting point to form a liquid oil. Typically, the slurry is added in the form of a vertically dispensed pencil jet (i.e., a confined stream) of the slurry. Single station filling methods are also known that involve applying the oil/salt slurry as a spray onto the kernel popcorn as the kernel popcorn falls into the bag. (See, for example WO 95/01105 entitled "Reduced Fat Microwave Popcorn and Method of Preparation" published Jan. 12, 1995, or, equivalently, U.S. Pat. No. 5,690,979 issued Nov. 25, 1997 which is incorporated herein by reference). Such single station filling techniques are especially useful for the preparation of low fat microwave popcorn products.

The bags now containing both kernel popcorn and slurry are then advanced to a sealing station where the bags are provided with a top seal to complete the closure of the bag. The sealed popcorn bags are advanced to subsequent finish packaging operations which complete the folding of the bags, providing the bags with an overwrap, and inserting appropriate numbers of the bags into cartons, etc.

Other additional optional materials can include any number of materials suitable for enhancing the appearance, nutritional, organoleptic or other attributes of the present popcorn product. Exemplary materials include flavors, colorants, vitamins, and preservatives. If present, such materials preferably can each comprise from about 0.01% up to 2% of the product. Seasonings preferably can also be added at conventional condiment levels typically ranging from about 0.1% to 3%. Such materials can be incorporated into the exemplary microwave popcorn production described above by incorporation with the oil filling station, the popcorn kernel filling station or in a separate filling station.

Flavors may be included such as artificial butter, cheese, pizza flavors, sugar or other sweeteners, savory flavors and other artificial or natural flavorings, and spices. The flavors can be oil soluble to mix compatibly with the base oil and homogeneously with the L,C-PUFA containing oil. The flavors can have a melting temperature similar to the base oil or at least above ambient temperature in order to have a homogeneous product during storage.

The popcorn compositions and products of the present invention preferably can have an omega-3 LC PUFA content such that an individual serving of the product has an appropriate amount of omega-3 LC PUFA per serving. Appropriate amounts of omega-3 LC PUFA per serving are known in the art. Preferred amounts of omega-3 LC PUFA per serving include amounts of omega-3 LC PUFA between about 5 mg per serving and about 150 mg per serving; between about 10 mg per serving and about 100 mg per serving; between about 25 mg per serving and about 75 mg per serving; and between about 35 mg per serving and about 50 mg per serving. Addition preferred amounts of omega-3 LC PUFA per serving include amounts of omega-3 LC PUFA between about 50 mg per serving and about 150 mg per serving; between about 75 mg per serving and about 125 mg per serving. Preferred omega-3 LC PUFAs include DHA, EPA and DPA.

In preferred embodiments, the popcorn products of the present invention comprise an antioxidant. If used, an antioxidant can be incorporated into the LC PUFA containing oil, the oil that is solid at 20° C., or both. Any antioxidant suitable for food oils preservation known in the art is compatible with the present invention, and include vitamin E, butylhydroxytoluene (BHT), butylhydroxyanisole (BHA), tert-butylhydroquinone (TBHQ), propyl gallate (PG), vitamin C (as used herein, reference to vitamin C includes derivatives thereof), phospholipids, and natural antioxidants such as rosemary extract, and combinations thereof. Preferred antioxidants include BHA, BHT, TBHQ, a blend of
BHA/BHT, and combinations thereof, and particularly, TBHQ. Amounts of antioxidant to include in the composition will vary depending on the application as determined by one skilled in the art. For example, popcorn products of the present invention comprising relatively greater amounts of omega-3 LC PUFAs (preferably having 20 or more carbons) preferably can contain higher amounts of antioxidant, such as, for example, amounts up to the maximum allowed by current United States law. Antioxidants may be added to or blended with an omega-3 LC PUFA oil by any method known in the art. Preferred amounts of antioxidant include amounts between about 0.01% and about 0.2%, and between about 0.05% and about 0.15% by weight.

The microwaveable popcorn products of the present invention preferably can be conventionally packaged. However, in preferred embodiments, the popcorn products of the present invention are stored under appropriate conditions to reduce oxidative degradation. Many methods to effect such storage conditions are known in the art and are suitable for use with the present invention, such as, for example, replacement of ambient air with an inert gas atmosphere. A preferred method by which to reduce or minimize oxidative degradation is to store the microwaveable popcorn products under a nitrogen ($N_2$) atmosphere or mixed nitrogen and carbon dioxide atmosphere. Preferably, the microwaveable popcorn products are packaged under nitrogen. Methods for producing a nitrogen gas atmosphere into a food container are known in the art.

The present invention, while disclosed in terns of specific methods, products, and organisms, is intended to include all such methods, products, and organisms obtainable and useful according to the teachings disclosed herein, including all such substitutions, modifications, and optimizations as would be available to those of ordinary skill in the art. The following examples and test results are provided for the purposes of illustration and are not intended to limit the scope of the invention.

EXAMPLES

Example 1

This example shows popcorn prepared in accordance with the present invention.

Approximately 10 grams of a saturated base oil/flavoring agent mixture was placed in a suitable vessel. The vessel was placed on a hot plate and the temperature was increased to 45° C. until the mixture was completely melted. DHA containing oil (DHA-HM (Martek Biosciences Corporation, Columbia, Md.) was added to achieve a level of 100 mg DHA/35 g serving of popped popcorn and mixed for one minute while flushing with nitrogen, or minimizing air exposure as much as possible. The whole mixture was then removed from the hot plate and added to a vessel containing popping corn, palm oil (approximately 8-10 g/serving), salt, natural and artificial flavors, butter, color additive, TBHQ and citric acid at ambient temperature, and mixed together by hand for about one minute. The mixture was then placed into a microwaveable bag, sealed shut, allowed to cool until the oil blend solidified and then microwaved at HIGH POWER/POP CORN SETTING for approximately 3.5 minutes or until no more popping was heard. Maximum temperature measured inside the bag immediately after popping was 128° C.

Example 2

This example shows the sensory evaluation of a product prepared in accordance with the present invention.

A panel of subjects undertook a "difference from control" sensory evaluation of microwaved popcorn. Panelists were asked to rate the flavor of DHA-containing microwaved popcorn (100 mg/serving) as compared to a control microwaved popcorn that contained no DHA. The overall flavor difference was measured on a scale of 0-10, with a sensory score of 0 corresponding to "no difference" and a sensory score of 10 corresponding to "very large difference." A small difference from control score is indicative of a small difference in flavor. A sensory evaluation of the product was undertaken at 0 and 2, months, stored at room temperature.

The results in FIG. 1 show that DHA-containing oil can be added to microwaveable popcorn at meaningful levels, while maintaining sensory integrity.

Example 3

This Example shows another example of the preparation of a product according to the present invention.

DHA-containing oil (e.g. DHA-HM™ (Martek Biosciences Corporation, Columbia, Md.) can be added to mnicrowavable popcorn bag formulations containing flavors such as butter with minimal process modifications and without negatively affecting the final product's flavor, texture or color. The DHA oil is added directly to the flavor mixture (butter) that will be added to the corn kernels going into the microwave bag. The DHA-containing oil can be safely added without creating negative interactions with other ingredients used in the manufacture of microwavable popcorn or during the process of popping. Martek has successfully fortified popcorn with DHA, up to 100 mg DHA per 35 g serving (popped).

Exemplary popcorn ingredients include: popping corn, color, palm oil, antioxidants, salt, citric acid, natural and artificial flavors, a DHA-containing oil (eg., Martek DHA-HM™).

Illustrating an exemplary method of addition, the DHA-containing oil is blended at the appropriate level with all other added ingredients to deliver the desired DHA dose (32-100 mg DHA/35 g serving). The mixture is then introduced into the bags containing the popcorn.

What is claimed is:

1. A microwaveable popcorn composition comprising:
   unpopped popcorn kernels, a first oil comprising an omega-3 LC PUFA (long chain polyunsaturated fatty acid) and a second oil that is solid at about 20° C., wherein the omega-3 LC PUFA is selected from the group consisting of docosahexaenoic acid, eicosapentaenoic acid, docosapentaenoic acid and mixtures thereof, wherein the composition comprises between about 10 mg and about 125 mg of omega-3 LC PUFA per serving, wherein the serving is 35 g of popped popcorn.

2. The microwaveable popcorn of claim 1, wherein the first oil is dispersed in the second oil.

3. The microwaveable popcorn composition of claim 1, wherein the first oil is from a microbial source.

4. The microwaveable popcorn composition of claim 3, wherein the microbial source is a microorganism selected from the group consisting of algae, bacteria, fungi, and protists.

5. The microwaveable popcorn composition of claim 3, wherein the microbial source is an oleaginous microorganism.

6. The microwaveable popcorn composition of claim 3, wherein the microbial source is selected from the group consisting of microorganisms of the genus Thraustochytrium, microorganisms of the genus Schizochytrium, microorganisms of the genus Althornia, microorganisms of the genus Aplanochytrium, microorganisms of the genus Japonochytrium, microorganisms of the genus Labyrinthula, microorganisms of the genus Labyrinthuloides, microorganisms of the genus Crypthecodinium, and mixtures thereof.

7. The microwaveable popcorn composition of claim 6, wherein the microorganism is selected from the group consisting of microorganisms of the genus Thraustochytrium, microorganisms of the genus Schizochytrium, microorganisms of the genus Crypthecodinium, and mixtures thereof.

8. The microwaveable popcorn composition of claim 1, wherein the first oil is from a plant source.

9. The microwaveable popcorn composition of claim 8, wherein the plant source has been genetically modified to produce long chain polyunsaturated fatty acids, wherein the plant is selected from the group consisting of soybean, corn, safflower, sunflower, canola, flax, peanut, mustard, rapeseed, chickpea, cotton, lentil, white clover, olive, palm, borage, evening primrose, linseed and tobacco.

10. The microwaveable popcorn composition of claim 8, wherein the plant source has not been genetically modified to produce long chain polyunsaturated fatty acids, wherein the plant is selected from the group consisting of soybean, corn, safflower, sunflower, canola, flax, peanut, mustard, rapeseed, chickpea, cotton, lentil, white clover, olive, palm, borage, evening primrose, linseed and tobacco.

11. The microwaveable popcorn composition of claim 1, wherein the first oil is from an animal source.

12. The microwaveable popcorn composition of claim 11, wherein the animal source is selected from the group consisting of aquatic animals, animal tissues and animal products.

13. The microwaveable popcorn composition of claim 1, wherein the omega-3 LC-PUFA is docosahexaenoic acid.

14. The microwaveable popcorn composition of claim 1, wherein the first oil is minimally processed.

15. The microwaveable popcorn composition of claim 1, wherein the first oil is not winterized.

16. The microwaveable popcorn composition of claim 1, wherein the first oil comprises at least about 20% omega-3 LC PUFAs.

17. The microwaveable popcorn composition of claim 1, wherein the first oil comprises at least about 60% omega-3 LC PUFAs.

18. The microwaveable popcorn composition of claim 1, wherein the composition comprises between about 30 mg and about 100 mg of omega-3 LC PUPA per serving, wherein the serving is 35 g of popped popcorn.

19. The microwaveable popcorn composition of claim 1, wherein the second oil is selected from the group consisting of palm oil, palm kernel oil, cocoa oil, shea nut oil and combinations thereof.

20. The microwaveable popcorn composition of claim 1, wherein the ratio of the second oil to the first oil is between about 20:1 and about 40:1.

21. The microwaveable popcorn composition of claim 1, further comprising an antioxidant.

22. The microwaveable popcorn composition of claim 21, wherein the antioxidant is selected from the group consisting of vitamin E, butylhydroxytoluene (BHT), butylhydroxyanisole (BHA), tert-butylhydroquinone (TBHQ), propyl gallate (PG), vitamin C, phospholipids, natural antioxidants, and combinations thereof.

23. The microwaveable popcorn composition of claim 21, wherein the antioxidant is present in an amount between about 0.01 and about 0.2 by weight of the second oil.

24. The microwaveable popcorn composition of claim 1, further comprising a flavoring agent.

25. The microwaveable popcorn composition of claim 1, wherein the flavoring agent is selected from the group consisting of natural flavors and artificial flavors.

26. The microwaveable popcorn composition of claim 25, wherein the flavoring agent is selected from the group consisting of butter, artificial butter, cheese, pizza flavors, sugar, sweeteners savory flavors and spices.

27. A microwavable popcorn product comprising: a) a container suitable for use in a microwave popcorn popping process, and b) a popcorn composition according to claim 1.

28. A process for preparing the microwavable popcorn composition of claim 1, comprising combining the first oil, the second oil and unpopped popcorn kernels.

29. A process for preparing popcorn, comprising subjecting the composition of claim 1 to microwave energy until the popcorn kernels are popped.

30. A popcorn product produced by the process of claim 29.

* * * * *